United States Patent Office 3,361,806
Patented Jan. 2, 1968

3,361,806
PROCESS FOR OXIDIZING CYCLOHEXANE TO ADIPIC ACID
Rex E. Lidov, Great Neck, N.Y., assignor to Halcon International, Inc., a corporation of Delaware
No Drawing. Filed July 9, 1965, Ser. No. 470,912
1 Claim. (Cl. 260—531)

This is a continuation-in-part of copending application Ser. No. 103,969 filed Apr. 19, 1961 and now abandoned.

This application is concerned with a process for the production of adipic acid by the further oxidation of the products of oxidation of cyclohexane after separation of cyclohexane from the oxidation mixture, and more particularly to stage wise oxidation of the cyclohexane to give high yields of adipic acid precursors and also to provide a low enough concentration of oxygen in the vent gas so that the latter is not a combustible mixture.

It is known that for the production of adipic acid by direct oxidation with a molecular oxygen containing gas, the oxygenated mixtures obtained by the lower temperature oxidation of cyclohexane are superior to the oxygenated mixtures produced by cyclohexane oxidation at higher temperatures. Cyclohexane oxidations conducted at low temperatures, however, are slow to start and, even when started, are sluggish. In consequence, the production of adipic acid precursors by low temperature oxidation of cyclohexane is uneconomically time consuming and to an extent dangerous, since an explosive concentration of oxygen, which is but slowly utilized, may be present. These problems must be overcome if the art is to be able to utilize the superior properties of the oxygenated mixtures produced by lower temperature oxidation of cyclohexane.

The discoveries associated with the invention relating to solution of the above problems and the objects in accordance with the invention as described herein include the provision of:

A process for the production of adipic acid from cyclohexane including the steps of contacting cyclohexane with molecular oxygen as the essential oxidant in a first oxidation zone to produce a mixture of cyclohexanone, cyclohexanol and oxygenated products, separating unreacted cyclohexane and recycling it to said first contacting zone, oxidizing said mixture in a second oxidation zone with nitric acid and a catalyst or with molecular oxygen in the presence of a catalyst chosen from the group consisting of manganese and copper, and separating adipic acid therefrom, including the improvement which comprises conducting the first step for an initial period of from 15 to about 45 min. at 140°–160° C., and at 75 to 500 p.s.i.g., and then at 120°–140° C. for a longer period;

Such a process in which the initial temperature in the first oxidation zone is 150° C. for a period of 30 minutes, and in which the subsequent temperature for a period of 90 minutes is 130° C., the reaction pressure being 150 p.s.i.g. for both periods;

Such a process using molecular oxygen wherein the weight ratio of cyclohexanone to cyclohexanol is at least 0.75 in the product from the first oxidation zone;

Such a process using a manganese and copper catalyst;

Such a process using a manganese catalyst;

And other objects which will be apparent as details or embodiments of the invention are set forth hereinafter.

In order to indicate still more fully the nature of the present invention, the following examples of typical procedures are set forth in which parts and percents mean parts and percents by weights, respectively, unless otherwise indicated, it being understood that these examples are presented as illustrative only and they are not intended to limit the scope of the invention.

EXAMPLE 1

Cyclohexane and catalyst (such as 100 p.p.m. of cobalt napthenate) are added to a first oxidation zone maintained at 150° C. for 30 minutes, and then 125° C. for 90 minutes and at 50 p.s.i.g. (so as to maintain the cyclohexane in a liquid phase). Air is bubbled through the cyclohexane at the rate of 0.25 s.c.f.m. Approximately 10% of the cyclohexane is converted to oil containing cyclohexanone, cyclohexanol and oxygenated compounds. The average concentration of oxygen in the vent gas is 2.5% by volume. All the unreacted cyclohexane is removed from the reaction mixture by distillation and is returned to the first oxidation zone for further conversion.

The oil so obtained (25 parts) is mixed with 75 parts acetic acid, 0.15 part manganese acetate and 1.0 part copper acetate and the mixture is fed to a second reaction zone maintained at 80° C. Air is passed through it at a rate of 1 to 2 s.c.f.h. at 100 p.s.i.g. The reaction mixture is then cooled and adipic acid separated, and there is obtained a 70.5 weight percent yield of adipic acid based on the weight of the oil.

Comparative example A

Cyclohexane is oxidized as described in Example 1 except that the oxidation is conducted at single oxidation temperature of 150° C. After an oxidation time of 90 minutes, about 10% of the cyclohexane is converted to oil. The average oxygen concentration in the vent gas is 2%.

The oil is recovered and oxidized to adipic acid as described in Example 1. A 64% yield of adipic acid is obtained.

Comparative example B

Cyclohexane is oxidized as described in Example 1 except that the oxidation temperature is maintained constant at 135° C. In order to obtain about a 10% cyclohexane conversion, the oxidation is continued for 450 minutes. The average concentration of oxygen in the vent gas during oxidation is 18%, an explosion hazard.

The oxidation oil is recovered and oxidized to adipic acid as described in Example 1. There is obtained a 71.3% yield of adipic acid.

These results clearly show that the process of the present invention gives an improved yield of product and also eliminates any explosion hazard in the vent gas.

Comparable results to the foregoing are achieved with various modifications thereof, including the following. In the oxidation of cyclohexane the mixture should be maintained at a first temperature of at least about 140° C. and a pressure of 75 to 500, preferably 125 to 175 p.s.i.g. for an initiation period of 15 up to about 45 minutes, preferably 20 to 30 minutes, and then at a second temperature of 120° to 140° C., preferably 125° to 135° C., for a longer period. The second temperature must be at least 5° C. lower than said first temperature. The cyclohexane is maintained in the liquid phase. The conversion of cyclohexane can be in the range of from 3 to about 20%. Desirably, the conversion is in the range of 10 to 20% and it is preferred to utilize a conversion of approximately 10%. If the conversion of cyclohexane is less than approximately 3 to 5%, difficulty is encountered in the step of separating the cyclohexane from the oil. Conversions in excess of 20% are not desired because, in general, as conversion increases in this first stage oxidation of cyclohexane, the relative yield of cyclohexanone and cyclohexanol, based on converted cyclohexane drops and the relative yield of undesirable products increases. Moreover, with increases in conversion the amount of solid formed increases. These, since they have but limited solubility in the reaction mixture, cause handling problems. A catalyst may be included, e.g., 1 to 1000, preferably 5 to 200 p.p.m. of cobalt napthenate.

Cooling the reacting hydrocarbon may be accomplished by lowering the pressure in the reactor so as to boil off a portion of the hydrocarbon. Alternatively, cooling coils or jackets may be used.

In the oxidation of the oil the temperature of the oxidation zone is maintained in the range of from about 60° to 105° C., desirably in the range of from 65° to 85° C., and preferably at 70° to 80° C., and the pressure is from about atmospheric to about 1,000 p.s.i.g., maintained so that the partial pressure of the oxygen is at least ⅛ atmosphere. Higher pressure may be used and in some cases it may be such that the partial pressure of the oxygen in the mixture going to the oxidation is as high, approximately, as 200 lbs. The rate at which air or oxygen-containing gas is fed for the oxidation either of cyclohexane or of the oil thereby obtained is governed, in part at least, by the geometric configuration of the particular reaction zone utilized; it should, of course, not be so great as to cause flooding or undesired entrainment of the material being oxidized.

Varying amounts of the oil produced by the oxidation of cyclohexane can be utilized as an initiator for the oxidation of cyclohexane. In general, it is not necessary to utilize more than about 0.5 to 1 part of oil per 100 parts cyclohexane undergoing oxidation, it being understood that larger amounts can be utilized.

While acetic acid has been used as the reaction medium in the foregoing examples, it will be realized that equally good results are obtained utilizing any of the saturated carboxylic acids having from 2 to 6 carbon atoms per molecule as reaction solvents. Moreover, a variety of other reaction media can be employed among which chlorobenzene, t-butyl alcohol, and the like can be mentioned. In general almost any substance which will act as a solvent for the reactants and which is itself not oxidized or, at least, not readily oxidized can be used. Of course, as will at once be evident, a change in solvent may require a change in the anion of the salt used for introduction of the manganese and copper oxidation catalysts. Thus, while in acetic acid these metal ions can profitably be used as acetates, in, for example, chlorobenzene, the insolubility of acetates dictates that the metal ions catalysts be used as napthenates. Such changes are obvious to practitioners in the field of metal ion catalyzed oxidations using molecular oxygen.

Instead of cyclohexane, methylcyclohexane, or similar materials may be oxidized in accordance with the invention.

It is indeed surprising that the practice of the invention described preserves the reaction rate characteristics of a high temperature oxidation procedure while, at the same time, providing an oil quality which heretofore has been obtainable only with uneconomical and potentially dangerous low temperature cyclohexane oxidation.

The improved temperature-staged oxidation of this invention results in improved yields of the adipic acid precursors obtained by air oxidation of cyclohexane. This new cyclohexane oxidation procedure is useful for processes in which additional molecular oxygen is used for conversion of these precursors to adipic acid. It is also useful for those processes which use other oxidizing agents for this purpose, e.g., nitric acid.

In view of the foregoing disclosures, variations and modifications thereof will be apparent to one skilled in the art, and it is intended to include within the invention all such variations and modifications except as do not come within the scope of the appended claim.

What is claimed is:

1. In a process for the production of adipic acid from cyclohexane wherein cyclohexane is oxidized at a temperature of 120 to 170° C. and a pressure of 75 to 500 p.s.i.g. in a first stage with molecular oxygen, a mixture of oxidation products mainly comprising cyclohexanol and cyclohexanone are separated from unreacted cyclohexane, and said mixture is oxidized to adipic acid with molecular oxygen in a second stage at a temperature of 60 to 105° C. and a pressure of atmospheric to 1,000 p.s.i.g., the oxidation carried out in acetic acid solvent and in the presence of manganese acetate catalyst, the improvement which comprises contacting the cylohexane in the liquid phase with molecular oxygen in said first stage for an initial period of 15 to 45 minutes at a first temperature of 140 to 170° C. and for a subsequent longer period at a second temperature in the range 120 to 140° C., said second temperature being at least 5° C. lower than said first temperature.

References Cited
UNITED STATES PATENTS
2,285,914  6/1942  Drossbach _____ 260—531
2,557,282  6/1951  Hamblet et al. _____ 260—533

FOREIGN PATENTS
738,808  10/1955  Great Britain.

LORRAINE A. WEINBERGER, *Primary Examiner.*

R. K. JACKSON, *Examiner.*

I. R. PELLMAN, V. GARNER, *Assistant Examiners.*